United States Patent

[11] 3,585,313

[72] Inventor Chester W. Newell
San Jose, Calif.
[21] Appl. No. 37,377
[22] Filed May 6, 1970
[45] Patented June 15, 1971
[73] Assignee Newell Industries, Inc.
Sunnyvale, Calif.
Continuation of application Ser. No. 680,820, Nov. 6, 1967, now abandoned.

[54] GUIDE AND TRANSDUCER MOUNTING MEANS FOR TAPE TRANSPORT SYSTEM
1 Claim, 6 Drawing Figs.

[52] U.S. Cl. .......... 179/100.2, 242/192
[51] Int. Cl. .......... G11b 5/54, G11b 15/32, G11b 15/60
[50] Field of Search .......... 179/100.2 CA, 100.2; 242/192, 197, 198, 199, 200

[56] References Cited

UNITED STATES PATENTS

| | | | |
|---|---|---|---|
| 2,658,956 | 11/1953 | Begun | 179/100.2 |
| 3,296,606 | 1/1967 | Neergaard | 340/174.1 |
| 3,370,803 | 2/1968 | Newell | 242/55.12 |
| 3,443,039 | 5/1969 | Bygdnes | 179/100.2 |

*Primary Examiner*—Terrell W. Fears
*Assistant Examiner*—Robert S. Tupper
*Attorney*—Flehr, Hohbach, Test, Albritton and Herbert ABSTRACT: A tape transport employing a capstan in contact with supply and takeup rolls of tape serves to drive the tape from supply to takeup roll. A crescent-shaped guide element defines a portion of the tape path and pulls a loop of tape from the capstan so as to guide the tape past a plurality of transducers. The guide element contains a plurality of pockets which are spanned by the tape. The transducers are disposed to move into and out of engagement with that portion of the tape spanning an associated one of the pockets of the guide element. The transducers are movable conjointly into and out of engagement with the tape. When the transducers are retracted, the tape can be automatically threaded from the supply to the takeup roll by the guiding action of the tape path. A front guide, together with the transducers, serves to define the outer boundary of the tape path facing the inner boundary as defined by the tape supporting surface of the guide element.

INVENTOR.

Chester W. Newell

BY Flehr, Hohbach, Test, Albritton + Herbert

Attorneys

INVENTOR.
Chester W. Newell
BY Flehr, Hohbach, Test, Albritton & Herbert
Attorneys INVENTOR.
Chester W. Newell
BY Flehr, Hohbach, Test, Albritton & Herbert
Attorneys

GUIDE AND TRANSDUCER MOUNTING MEANS FOR TAPE TRANSPORT SYSTEM

This application is a continuation of a prior application Ser. No. 680,820 filed on Nov. 6, 1967 and now abandoned.

BACKGROUND OF THE INVENTION AND OBJECTS

This invention pertains to tape transports of a type for feeding a pliable recording tape between supply and takeup rolls. This invention, more particularly, relates to such a transport combining the advantages of both the "zero loop" and "closed loop" style of machine while avoiding certain of their disadvantages.

In the "closed loop" style of tape transport, a capstan and pinch roller are positioned at the neck of a tape loop, engaging and driving both shanks of the loop, and the transducers are positioned so as to engage the isolated tape of the loop at a point where the tape is unsupported from behind. In the "zero loop" style of transport, the transducers engage the tape at a point where the tape is supported directly from behind by the capstan. By providing a continuous support of the tape throughout that zone defined between the supply and takeup rolls, a "zero loop" transport is far less subject to the introduction of certain vibrations of the tape causing serious objectionable performance characteristics.

In the "closed loop" style of transport where the tape in the region of the transducer is unsupported from behind, it has been observed that "scrape flutter" and tape skew can develop so as to introduce certain of these objectionable characteristics. In the "zero loop" style of transport, it will be readily apparent, however, that if the capstan is the least bit out-of-round, there may be generated undesirable variations in head to tape pressure which can introduce objectionable transducing problems not found in the "closed loop" systems where the transducer bears against the tape at a point where it is out of contact with the rotating capstan.

In addition, it has been observed that where several transducers are disposed to bear against the tape supported by the rotating capstan, as in a "zero loop" system, the tension loss caused by the head to tape pressure becomes cumulative for each additional transducer employed. Thus, each transducer has been observed to diminish the tension in the portion of tape carried by the capstan by an amount related to its particular head to tape pressure. If the tension in that portion of the tape is reduced sufficiently, it can cause the system to "-grow a loop" due to insufficient tension in the tape to cause it to continue to be properly carried by the capstan. This problem can, of course, be solved by employing fewer transducers, by increasing the initial tension of that portion of the tape carried by the capstan, or by reducing the head to tape pressure for each of the transducers. Each of the foregoing solutions has its own inherent limitations and may for particular reasons be undesirable in a given circumstance.

The foregoing observation has been referred to herein as the "clamping effect" characteristic of a "zero loop" system as respects that portion of the tape encircling the drive capstan.

It has been further observed that if this "clamping effect" can be released by pulling a loop away from the capstan in an otherwise "zero loop" system, the cumulative tension losses as occur in "zero loop" systems can be greatly reduced, and in this manner the tension in the span of tape encircling the capstan will be much more evenly distributed.

It is a general object of the present invention to provide an improved tape transport apparatus which serves to combine certain advantages of both the "closed loop" and "zero loop" style of tape transport.

It is another object of the present invention to provide a tape transport apparatus wherein essentially total support is given to the tape from behind but without the disadvantages manifested as cumulative tension losses to be found in the span of tape cooperating with a plurality of transducers.

These and other objects of the invention will become more readily apparent when considered in conjunction with the following drawings.

SUMMARY OF THE INVENTION

Figure 1:
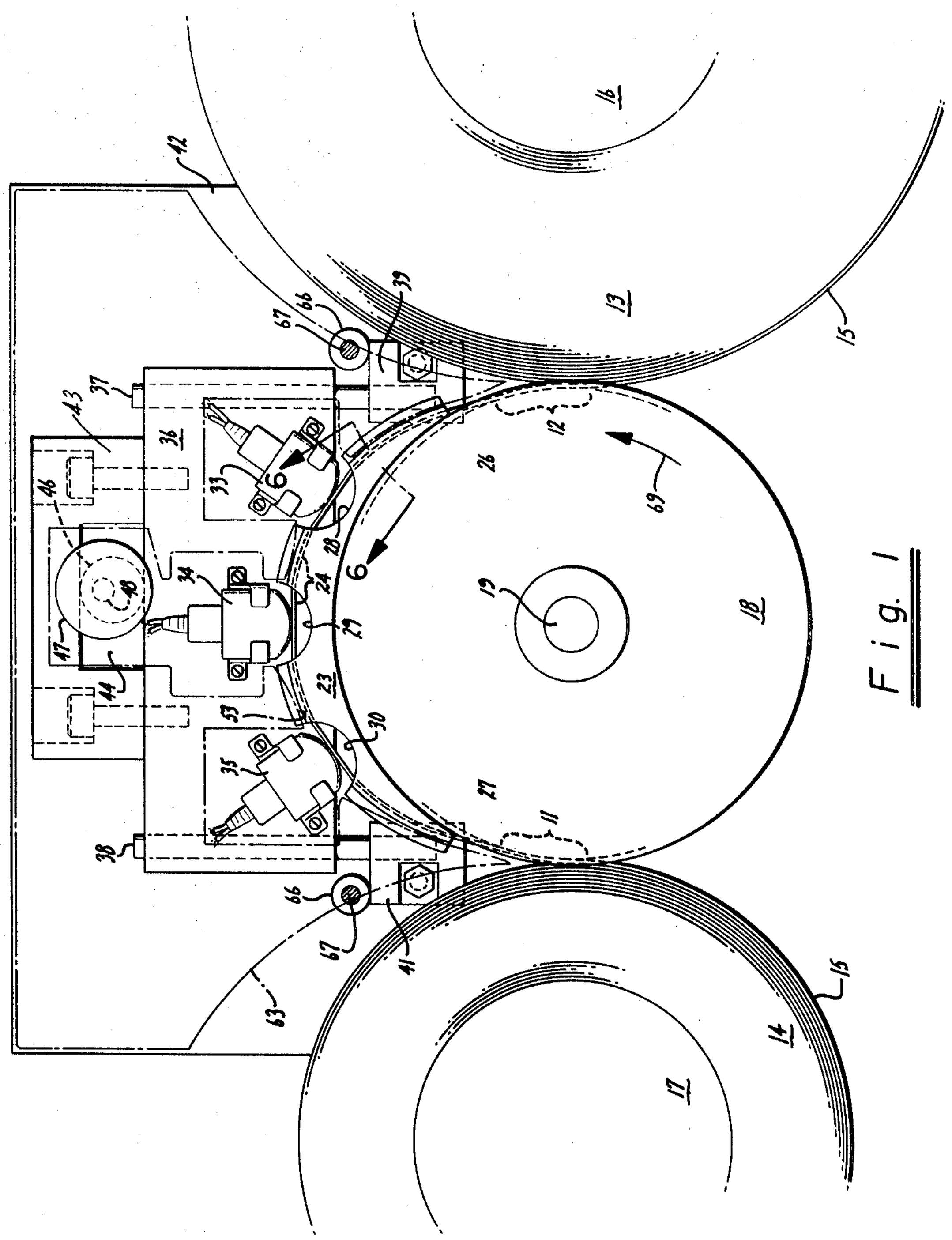
FIG. 1 is a plan view of a tape transport apparatus according to the invention with a top cover removed.
Figure 2:
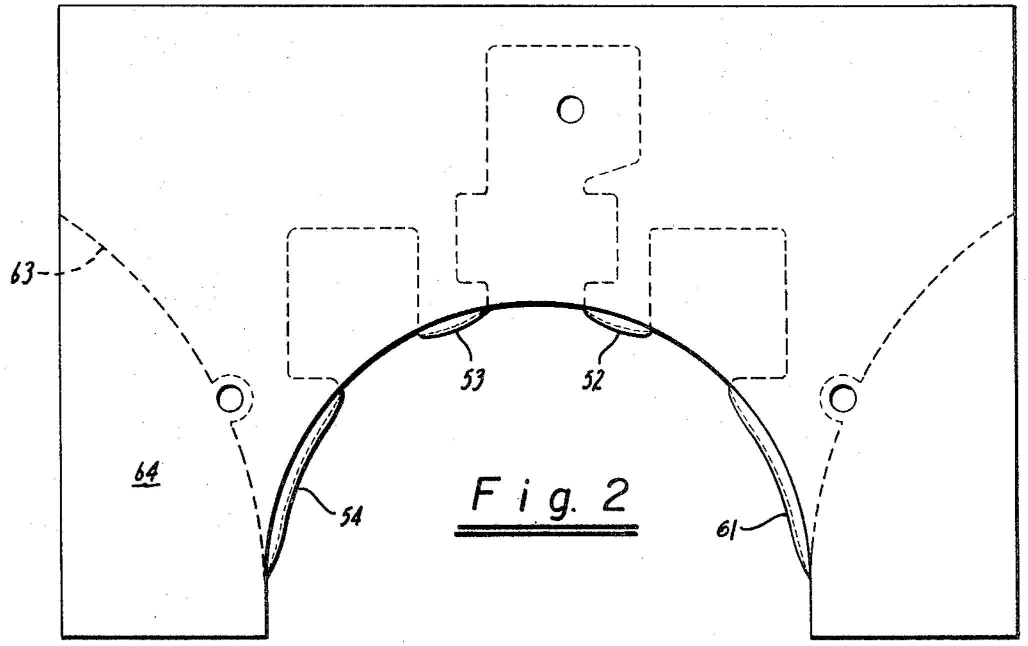
FIGS. 2 and 3 are plan views of the top cover viewed respectively from above and below.
Figure 3:
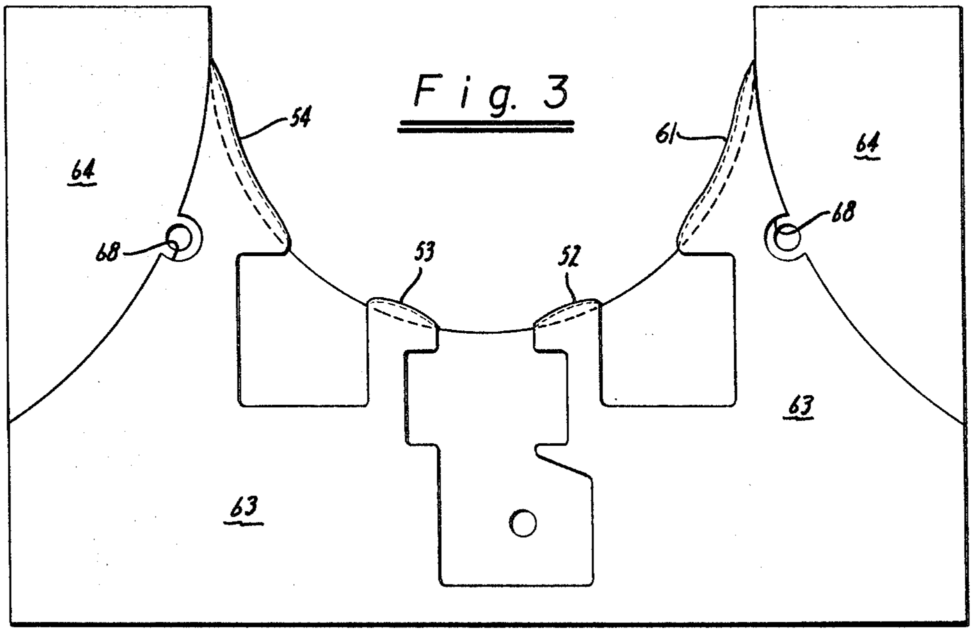

In general, there is disclosed a tape transport of the type having a length of pliable recording tape wrapped to form rotatable supply and takeup rolls. A rotatable drive capstan is disposed and adapted to engage the tape in the region of two spaced arcuate surface portions 11, 12 of the capstan. A guide element is disposed intermediate the two arcuate surface portions 11, 12 and includes a tape supporting surface which extends between the portions 11, 12. The tape support surface of the guide element includes at least one opening which is spanned by the tape together with a transducer which is relatively movable into and out of cooperative engagement with that particular tape portion.

In a particularly preferred construction, a plurality of transducers has been so arranged whereby each cooperates with its own associated opening in the guide element. The guide element serves to release the "clamping effect" which would otherwise be occasioned by wrapping the tape about the capstan and thereby generally serves to distribute the tension in the span of tape between the supply and takeup rolls.

DESCRIPTION OF A PREFERRED EMBODIMENT

Referring to the drawings, there is schematically shown a tape transport construction according to the invention. The tape transport includes supply and takeup rolls 13, 14. Each roll 13, 14 includes a number of convolutions of tape 15 wrapped about an associated hub 16, 17, respectively. Each hub 16, 17 is supported by means (not shown) for rotation. It is to be understood that during feeding of tape, the rolls 16, 17 advance and retreat relative to a drive capstan 18.

Capstan 18 is driven by a motor (not shown) acting through the axle 19.

Flanges **20*a* and 20*b*, carried by capstan 18, bound the edges of surface 21 and preferably overlap the outer convolutions of tape on rolls 13, 14 for edge guiding the tape moving toward crescent guide element 23**.

The guide element 23 in the form of a crescent-shaped "-moon" guide construction lies adjacent the supporting surface 21 of capstan 18. Guide element 23 includes a tape support surface 24 which extends between zones 11, 12 and essentially forms a continuation of the supporting surface 21 of capstan 18. The back side of element 23 is formed with recesses **25*a* and 25*b* respectively accommodating flanges 20*a* and 20*b* while permitting the protruding land 25*c* to substantially abut surface 21** in closely spaced relation.

The spacing between surfaces 21 and 24 at the transition points 26, 27 therebetween is sufficiently closely defined as to be on the order of the thickness of the tape. Thus, it can be observed that surface 24 forms essentially a continuation of surface 21 to provide virtually no unsupported tape at transition points 26, 27 which could serve to introduce objectionable "-scrape flutter" or the like.

Guide element 23 includes a plurality of three openings in the form of pockets 28, 29, 30 disposed and adapted to be spanned by tape 15 passing thereacross. Further, guide element 23 includes spaced longitudinally extending flanges 31, 32 which serve to engage the edges of tape 15 in guiding relation thereto.

A plurality of, for example, three transducers 33, 34, 35, respectively associated with pockets 28, 29, 30 are mounted in common upon a support block 36 whereby transducers 33, 34, 35 may be conjointly moved into and out of engagement with tape 15 in the region of the pockets.

Thus, block 36 is supported upon a pair of guide pins 37, 38 journaled in openings drilled through block 36. Pins 37, 38 are respectively anchored in mounting blocks 39, 41 bolted to a base plate 42 forming a portion of the permanent frame of the transport.

Means for moving transducers 33, 34, 35 into and out of engagement with tape 15 includes a U-shaped member 43 bolted to the side of block 36. Member 43, therefore, defines a rectangular opening 44 adapted to cooperate with an eccentric 46 which can be rotated by the knurled knob 47 carried on shaft 48. Shaft 48 is journaled at its lower end in base plate 42 whereby rotation of knob 47 serves to rotate eccentric 46 and thereby to move transducers 33, 34, 35 into and out of engagement with tape 15.

Means defining a closed channel extending essentially from roll 13 to takeup roll 14 includes not only the support surface 24 of guide element 23, the bounding flanges 31, 32 of guide element 23 and the tape engaging portions of transducers 33, 34 and 35, but also further includes means forming a front guide construction adapted to engage and deflect the leading end of tape, such as by a tape leader portion 58 as it enters the closed channel so defined.

Figures 4, 5, 6:
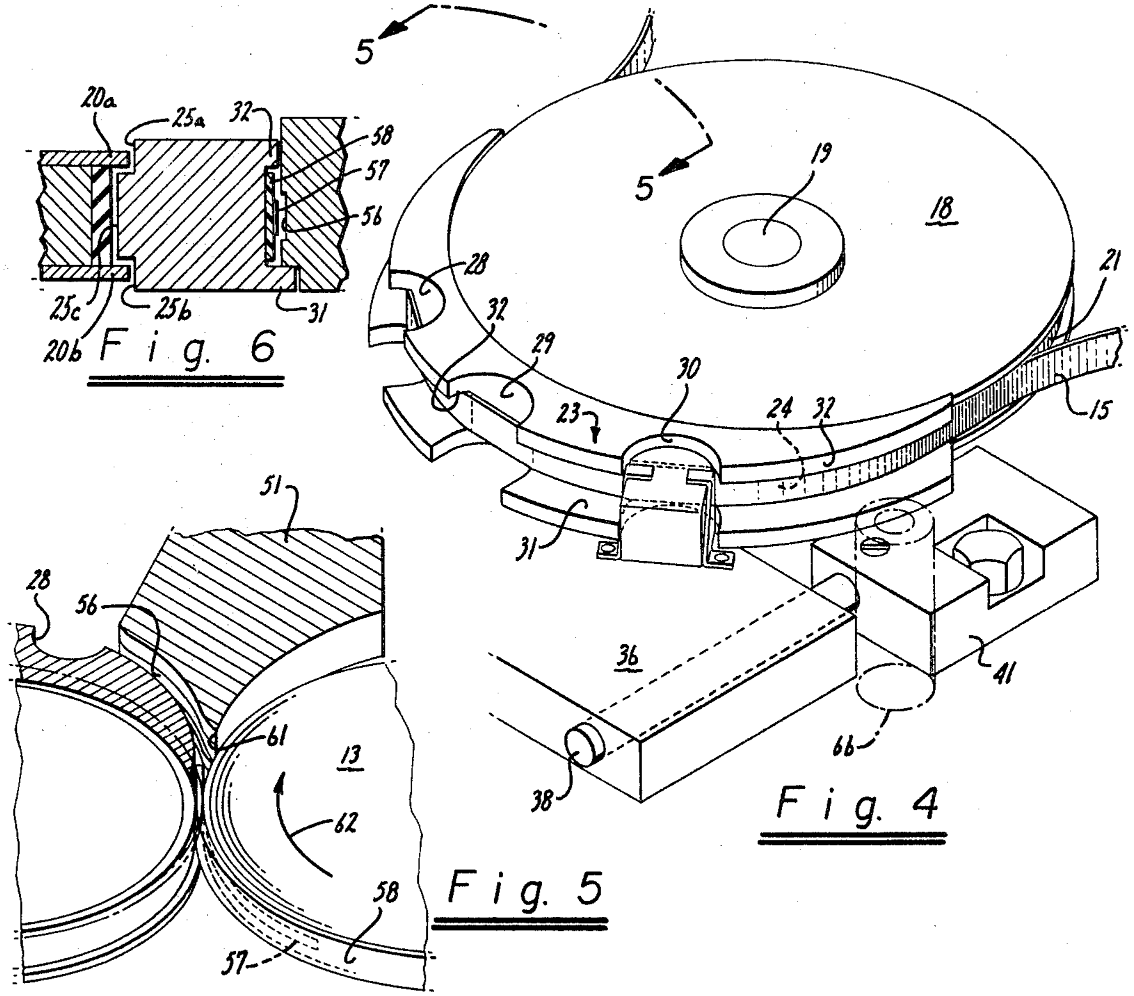
FIG. 4 is an enlarged perspective view showing a tape guide element and related components according to the invention.
FIG. 5 is an enlarged detailed perspective view of a portion, for example, taken along the line 5–5 of FIG. 4, with certain parts removed and added.
FIG. 6 is a detailed section view taken along the line 6–6 of FIG. 1.

The front guide construction includes a plurality of lands 51, 52 53 and 54 adapted to provide tape leader engaging and guiding surfaces in position flanking the transducers 33, 34 and 35, and in positions confronting tape supporting surface 24 of guide element 23. The face of each land 51—54 includes a shallow groove 56 (FIG. 6) disposed opposite to and adapted to accommodate the passage of an adhesion strip 57 carried on the inside surface of a leader portion 58 of tape 15 so as to adhere the outermost convolution of tape roll 13 to the penultimate outermost convolution thereof. The end 59 of leader portion 58 is unadhered to roll 13 to form a tab which normally extends in a manner adapted to engage the peeling surface 61 of land 51. Thus, as roll 13 rotates in the direction of arrow 62, the leading end 59 will be engaged by peeling surface 61 and surface 61 will serve to release the grip of strip 57 and cause tape 15 to be directed into the closed channel defined by the confronting surfaces of lands 51—54 and guide element 23.

Lands 51—54 are formed as a portion of a larger planar member attached to and thereby carried by a top plate 64 which serves as a cover plate. Top plate 64 and its associated land member 63 are supported by posts 66 recessed into member 63 and secured to cover plate 64 by suitable means such as screws 67.

When cover plate 64 is disposed upon posts 66 recessed into the openings 68, lands 51—54 will flank transducers 33—35 in the manner above described.

In the foregoing construction, suitable means for tensioning the span of tape defined between supply and takeup rolls 13, 14 should be provided in order to place that span of tape under suitable tension. This can be done, for example, in the manner shown in my copending application, Ser. No. 480,324.

Operation of the tape transport as above described proceeds as follows.

All transducers 33—35 are initially retracted by rotation of knob 47. Thus, with a supply roll 13 in position to commence feeding of tape therefrom, capstan 18 is rotated. The leading end of tab 59 being unadhered to roll 13, as roll 13 is rotated, tab 59 is picked up by peeling surface 61. Continued rotation clockwise (as shown in FIG. 1) of roll 13 serves to cause peeling surface 61 to release the grip of strip 57. Strip 57 confronts groove 56 so as to accommodate its passage along lands 51—54. Upon arrival at zone 11, strip 57 will be pressed into engagement with hub 17 and wrapped upon it so as to form takeup roll 14. By supporting tape 15 in this manner, relief is obtained from the accumulation of individual tension losses caused by the head to tape pressure between each transducer and the tape. The tension losses are, therefore, more evenly distributed throughout that zone defined by the supply and takeup rolls 13, 14. This can be explained, it is believed, by the fact that guide element 24 serves to release the "clamping effect" normally occasioned by wrapping the tape about the surface of a drive capstan.

It will be readily apparent to those skilled in the art that transducers 33—35 can be either of a single channel or multiple channel construction for cooperating with only a single track or selectively cooperating with any of various tracks of information carried on tape 15. Furthermore, it will be apparent that the transducers 33—35 can be made to accommodate desired transducing modes as where, for example, transducer 33 may serve to erase a data track along tape 15, transducer 34 records in the same track and subsequently transducer 35 reads data from the same track.

It is contemplated that the foregoing apparatus can be operated in a bidirectional mode and accordingly the number of transducers and the selection of same can be expected to vary accordingly.

It will be readily apparent from the foregoing description that an improved tape transport has been provided having the advantages outlined above.

What I claim is:

1. In a tape transport of a type having a length of pliable recording tape wrapped to form rotatable supply and takeup rolls, apparatus comprising a capstan for driving said tape and for engaging the tape rolls in the region of two spaced arcuate surface portions of the capstan, guide means radially outwardly adjacent the capstan and intermediate said portions and having a stationary support surface for supporting the tape extending between the rolls, said tape support surface including at least one opening therein spanned by the tape, and a transducer disposed radially outwardly of said tape and relatively movable into and out of cooperative engagement with the radially outer surface of that tape portion so spanning said opening.